United States Patent
Itoh et al.

(10) Patent No.: US 8,274,689 B2
(45) Date of Patent: Sep. 25, 2012

(54) IMAGE PROCESSING APPARATUS, COMPUTER-READABLE RECORDING MEDIUM, AND METHOD FOR ACQUIRING AND OUTPUTTING AN IMAGE

(75) Inventors: Ayumi Itoh, Ikoma-gun (JP); Jun Kunioka, Kawanishi (JP); Hidetaka Iwai, Itami (JP); Mitsuharu Nagai, Amagasaki (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 240 days.

(21) Appl. No.: 12/555,849

(22) Filed: Sep. 9, 2009

(65) Prior Publication Data

US 2010/0067044 A1    Mar. 18, 2010

(30) Foreign Application Priority Data

Sep. 17, 2008    (JP) ................................. 2008-238342

(51) Int. Cl.
*G06F 15/00* (2006.01)
*G06K 1/00* (2006.01)

(52) U.S. Cl. ......................... 358/1.15; 358/1.16; 358/1.9

(58) Field of Classification Search ................... 358/1.1, 358/1.9, 1.11, 1.12, 1.13, 1.14, 1.15, 1.16, 358/1.17, 1.18
See application file for complete search history.

(56) References Cited

U.S. PATENT DOCUMENTS

| 2002/0005839 | A1 | 1/2002 | Nojiri |
| 2003/0103232 | A1* | 6/2003 | Twede ........................ 358/1.15 |
| 2006/0274360 | A1 | 12/2006 | Fukui et al. |
| 2008/0168441 | A1 | 7/2008 | Imamichi |
| 2008/0178199 | A1 | 7/2008 | Tanabe |
| 2008/0186531 | A1 | 8/2008 | Ikeda |
| 2009/0113329 | A1* | 4/2009 | Corona ......................... 715/769 |

FOREIGN PATENT DOCUMENTS

| JP | 2001-345965 A | 12/2001 |
| JP | 2003-345954 A | 12/2003 |
| JP | 2004-288041 A | 10/2004 |
| JP | 2005-032073 A | 2/2005 |
| JP | 2005-275807 A | 10/2005 |
| JP | 2006-081093 A | 3/2006 |
| JP | 2006-334870 A | 12/2006 |
| JP | 2008-154076 A | 7/2008 |
| JP | 2008-160176 A | 7/2008 |
| JP | 2008-172725 A | 7/2008 |

OTHER PUBLICATIONS

Office Action from Japanese Patent Office issued in Applicant's corresponding Japanese Application No. 2008-238342 dated Aug. 17, 2010, and an English Translation thereof.

* cited by examiner

*Primary Examiner* — Thierry Pham
(74) *Attorney, Agent, or Firm* — Buchanan Ingersoll & Rooney PC

(57) ABSTRACT

An image processing apparatus includes a display; a memory for storing first information indicating an acquisition source of image data, second information indicating an editing process of the image data and third information indicating an output destination of the image data associated with one another as a setting information group; an accepting unit for accepting the first information to the third information; a display control unit for displaying images used for accepting the first information to the third information on a first area to a third area, respectively, of the display; and a registration unit for, when the accepting unit accepts at least two pieces of information of the first information to the third information, registering the at least two pieces of information of the first information to the third information as the setting information group in the memory.

19 Claims, 15 Drawing Sheets

FIG.5

| CLASSIFICATION | SETTING ITEMS | | DATA CONTENT |
|---|---|---|---|
| SETTING INFORMATION | ·WORKFLOW NUMBER | | WORKFLOW REGISTRATION NUMBER |
| | ·WORKFLOW NAME | | WORKFLOW REGISTRATION NAME |
| | ·REFERENCE PERMISSION GROUP | | REFERENCE PERMISSION SETTING |
| | ·REFERENCE PERMISSION LEVEL | | |

| CLASSIFICATION | SETTING ITEMS | | DATA CONTENT |
|---|---|---|---|
| INPUT INFORMATION | ·TYPE | SCAN, BOX, EXTERNAL STORAGE | INPUT SOURCE OF DOCUMENT |
| | ·REGISTRATION TYPE | DOCUMENT, ENTIRE BOX, BOX DESIGNATION | TYPE OF WORKFLOW |
| | ⟨Scan⟩ | | |
| | ·SCAN DATA FORMAT | | FILE FORMAT OF INPUT DOCUMENT |
| | ·PAGE SETTING | | |
| | ·RESOLUTION | | RESOLUTION SETTING OF INPUT DOCUMENT |
| | ·SINGLE SIDE/DOUBLE SIDE | | READING SIDE SETTING OF INPUT DOCUMENT |
| | ·DOCUMENT IMAGE QUALITY | CHARACTER, DOCUMENT ON WHICH CHARACTERS ARE WRITTEN IN LIGHT DENSITY, COPY DOCUMENT | DOCUMENT IMAGE QUALITY SETTING OF INPUT DOCUMENT |
| | | CHARACTER/PHOTOGRAPH | |
| | | PHOTOGRAPH | |
| | ·DENSITY | | DOCUMENT DENSITY SETTING OF INPUT DOCUMENT |
| | ·COLOR | | COLOR SETTING OF INPUT DOCUMENT |
| | ·SEQUENTIAL READING SETTING | | SEQUENTIAL READING SETTING OF INPUT DOCUMENT |
| | ⟨Box⟩ | | |
| | ·Box_ID | | BOX NUMBER |
| | ·Doc_ID | | DOCUMENT NUMBER |
| | ⟨EXTERNAL STORAGE⟩ | | |
| | ·ID | | EXTERNAL STORAGE NUMBER |
| | ·LOGIN NAME | | LOGIN NAME OF EXTERNAL STORAGE |
| | ·PASSWORD | | PASSWORD OF EXTERNAL STORAGE |
| | ·DOCUMENT NAME | | NAME OF INPUT DOCUMENT |
| | ⟨LINKAGE TO MOBILE PHONE⟩ | | |
| | ·CONNECTION OF MOBILE PHONE | | PIN CODE FOR MOBILE PHONE CONNECTION |
| | ⟨MEDIUM⟩ | | |
| | ·DOCUMENT POSITION WITHIN MEDIUM | | FILE PATH |

FIG.7

| CLASSIFICATION | SETTING ITEMS | | DATA CONTENT |
|---|---|---|---|
| DOCUMENT EDIT INFORMATION | ·FILE FORMAT | | OUTPUT FILE FORMAT (PDF,TIFF,JPEG) |
| | ·PAGE SETTING | | |
| | ·STAMP COMPOSITION METHOD | | SETTING AT THE TIME OF FORCED STAMP |
| | ·ENCRYPTED PDF | ·ENCRYPTED PDF | ENCRYPTION SETTING OF PDF |
| | | ·ENCRYPTION TARGET | |
| | | ·ENCRYPTION TYPE | |
| | | ·SIGNATURE | |
| | | ·ENCRYPTION LEVEL | |
| | | ·PASSWORD | |
| | | ·AUTHORITY OF DOCUMENT | |
| | | ·PRINT PERMISSION LEVEL | |
| | | ·EXTRACTION OF DOCUMENT AND IMAGE | |
| | | ·CHANGE PERMISSION LEVEL | |
| | ·DOCUMENT PROPERTY SETTING OF PDF | ·TITLE | ·SETTING OF PDF DOCUMENT |
| | | ·APPLICATION OF FILE NAME | |
| | | ·CREATOR | |
| | | ·SUBTITLE | |
| | ·DOCUMENT CONNECTION ORDER | | |
| | ·PAGE TRANSFER | ·INSERTION SETTING | |
| | ·PAGE ROTATION | | |
| | ·PAGE DELETION | | |

FIG.8

| CLASSIFICATION | SETTING ITEMS | | DATA CONTENT |
|---|---|---|---|
| OUTPUT INFORMATION | ·TYPE | PRINT, TRANSMISSION | METHOD FOR OUTPUTTING DOCUMENT |
| | <PRINT> | | |
| | ·NUMBER OF COPIES | | NUMBER OF OUTPUT COPIES |
| | ·SINGLE SIDE/DOUBLE SIDE PRINT | | OUTPUT PRINTING SURFACE SETTING |
| | ·FINISHED CONDITION | | OUTPUT FINISHED CONDITION SETTING |
| | PAGE GROUPING | ·GROUPING | OUTPUT GROUPING SETTING |
| | | ·GROUPING NUMBER | |
| | | ·GROUPING ORDER | |
| | ·COLOR | | OUTPUT COLOR SETTING |
| | ·SCALING FACTOR | ·SETTING FOR EACH DOCUMENT | OUTPUT SCALING FACTOR SETTING |
| | | ·SAME SCALING FACTOR | |
| | | ·SMALLER | |
| | | ·ZOOM | |
| | | ·FIXED SCALING FACTOR | |
| | | ·REGISTERED SCALING FACTOR | |
| | <TRANSMISSION> | | |
| | ·TRANSMISSION DESTINATION SETTING | | WHETHER REGISTERED DESTINATION CORRESPONDS TO GROUP DESTINATION OR NOT |
| | ·ABBREVIATED DESTINATION NUMBER | | ABBREVIATED DESTINATION REGISTERED IN MFP |
| | ·CALLING OF GROUP DESTINATION | | GROUP DESTINATION REGISTERED IN MFP |
| | ·MAIL DISTRIBUTION BY S/MIME | | ENCRYPTION OF MAIL  YES/NO |
| | ·ADDITION OF DIGITAL SIGNATURE | | DIGITAL SIGNATURE  YES/NO |
| | ·DESTINATION CONCERNING PERSONS | | DESTINATION CONCERNING PERSONS |

FIG.9

| MR. A | PLEASE SELECT TRANSMISSION DESTINATION | 7/15/2008 22:02 |
|---|---|---|
| DESTINATION TO WHICH DATA IS READ | | DESTINATION TO WHICH DATA IS TRANSMITTED |
| BOX1 BOX2 SCAN BOX LIST | FILE X  FILE Y  FILE Z  DELETION  EXTRACTION  CONNECTION | MR. A MR. B PRINT DESTINATION LIST |

| MR. A | PLEASE SELECT BOX TO BE USED (UNDER REGISTRATION) | 7/15/2008 22:02 |
|---|---|---|
| DESTINATION TO WHICH DATA IS READ | | |
| BOX1 BOX2 SCAN BOX LIST | BOX1  BOX2  BOX3  BOX4  BOX5  BOX6  CANCEL  OK | |

■DESTINATION LIST

| MR. A | PLEASE SELECT DESTINATION TO BE REGISTERED IN WORKFLOW (UNDER REGISTRATION) REGISTRATION NAME: TRANSMIT REQUEST FORM | 7/15/2008 22:02 |
|---|---|---|
| | | DESTINATION TO WHICH DATA IS TRANSMITTED |
| | E-mail1  E-mail2  E-mail3  E-mail4  E-mail5  E-mail6  CANCEL  OK | MR. A  MR. B  PRINT  DESTINATION LIST |

| MR. A | PLEASE SELECT DESTINATION | 7/15/2008 22:02 |
|---|---|---|
| DESTINATION TO WHICH DATA IS READ | | DESTINATION TO WHICH DATA IS TRANSMITTED |
| BOX1  BOX2  SCAN  BOX LIST | FILE X  FILE Y  FILE Z | MR. A  MR. B  PRINT  DESTINATION LIST |

■SELECTION OF DESTINATION TO WHICH DATA IS READ

| MR. A | WORKFLOW IS REGISTERED REGISTRATION NAME: TRANSMIT REQUEST FORM | 7/15/2008 22:02 |
| --- | --- | --- |
| DESTINATION TO WHICH DATA IS READ | | DESTINATION TO WHICH DATA IS TRANSMITTED |
| BOX1 BOX2 SCAN BOX LIST | ◁ SELECTION OF READING SOURCE PLEASE SELECT READING SOURCE FROM ICONS  CANCEL  OK | MR. A MR. B PRINT DESTINATION LIST |

■SELECTION OF DESTINATION TO WHICH DATA IS READ (DOCUMENT)

| MR. A | PLEASE SELECT DOCUMENT TO BE USED | 7/15/2008 22:02 |
| --- | --- | --- |
| DESTINATION TO WHICH DATA IS READ | | |
| BOX1 BOX2 SCAN READING LIST | FILE X   FILE Y   FILE Z    CANCEL  OK | |

■SELECTION OF TRANSMISSION DESTINATION

| MR. A | WORKFLOW IS REGISTERED REGISTRATION NAME: TRANSMIT REQUEST FORM | 7/15/2008 22:02 |

DESTINATION TO WHICH DATA IS READ / DESTINATION TO WHICH DATA IS TRANSMITTED

- BOX1
- BOX2
- SCAN
- BOX LIST

FILE X

SELECTION OF TRANSMISSION DESTINATION ▷
PLEASE SELECT TRANSMISSION DESTINATION FROM ICONS

CANCEL  OK

MR. A
MR. B
PRINT
DESTINATION LIST 138A   138B   1382  1381   138C

■BEFORE REGISTRATION

| MR. A | WORKFLOW IS REGISTERED REGISTRATION NAME: TRANSMIT REQUEST FORM | 7/15/2008 22:02 |

DESTINATION TO WHICH DATA IS READ / DESTINATION TO WHICH DATA IS TRANSMITTED

- BOX1
- BOX2
- SCAN
- BOX LIST

FILE X    MR. B

CANCEL   WORKFLOW REGISTRATION

MR. A
MR. B
PRINT
DESTINATION LIST 138A   138B  1382   1386   138C

138(136)

IMAGE PROCESSING APPARATUS, COMPUTER-READABLE RECORDING MEDIUM, AND METHOD FOR ACQUIRING AND OUTPUTTING AN IMAGE

This application is based on Japanese Patent Application No. 2008-238342 filed with the Japan Patent Office on Sep. 17, 2008, the entire content of which is hereby incorporated by reference.

BACKGROUND OF THE INVENTION

1. Field of the Invention

The present invention relates to an image processing apparatus capable of acquiring an image from an acquisition source and outputting the image to an output destination, an image processing method, and a computer-readable recording medium recording an image processing program. Particularly, the present invention relates to an image processing apparatus that allows the user to register the information such as an acquisition source and an output destination and also to use the registered information such as an acquisition source and an output destination, an image processing method, and a computer-readable recording medium recording an image processing program.

2. Description of the Related Art

As an image processing apparatus capable of acquiring an image from the acquisition source and outputting the image to the output destination, an image processing apparatus is well known which reads the image stored in the hard disk to save the image in the external server apparatus via the network. There is a need for such an image processing apparatus by which the user can reuse the information such as an acquisition source and an output destination, as required, that has been input in the past. The following techniques are proposed with regard to the image processing apparatus in which the input information such as an acquisition source and an output destination is stored to thereby allow this input information to be reused.

For example, Japanese Laid-Open Patent Publication No. 2006-334870 discloses an image processing system. According to Japanese Laid-Open Patent Publication No. 2006-334870, a plurality of MFPs constituting the image processing system each store the registration user information in the HDD including at least the user identification information used for identifying the user, requests at least one of other MFPs to transmit the registration user information stored in the HDD provided in the at least one of the other MFPs, receives the registration user information transmitted by the at least one of the other MFPs in response to the request, and stores the user data including at least the received registration user information in the HDD.

Furthermore, Japanese Laid-Open Patent Publication No. 2001-345965 discloses a condition setting input apparatus. According to Japanese Laid-Open Patent Publication No. 2001-345965, the condition setting input apparatus includes a hierarchical setting input screen for inputting the condition; a setting confirmation screen on which a list of conditions input on the setting input screen is displayed; memory registration instructing means provided on the setting confirmation screen for giving an instruction to store the input condition in a memory; and memory calling instructing means for calling the condition stored in the memory to be used.

Furthermore, Japanese Laid-Open Patent Publication No. 2003-345954 discloses a workflow management apparatus. According to Japanese Laid-Open Patent Publication No. 2003-345954, in accordance with one or more workflows registered in the flow table, the processes in the processing unit are selectively carried out in the workflow control unit to proceed with the workflow. In this case, history information is generated each time the process in the processing unit is carried out, and the generated history information is stored in the history storing unit. The history storing unit stores the history information for each process in the processing unit. In addition, the history information includes the information used for referring to the history information of the process carried out at other stages in the workflow in which the history information is remained, to thereby allow acquisition of the history information along the process flow in the workflow. As a matter of course, the history processed in the workflow can also be stored as a flow history in the history storing unit.

Furthermore, Japanese Laid-Open Patent Publication No. 2006-081093 discloses an image processing apparatus. According to Japanese Laid-Open Patent Publication No. 2006-081093, a function group registration unit is used to group and register one or more function setting screens in advance. In the case where the user sets the setting value for each function, the grouped and registered function setting screens are read in the function group reading unit, the resultant grouped function setting screens are sequentially displayed in the function selecting unit, and then, the function setting operation is carried out in the parameter setting unit.

However, in the image processing apparatus as described in the above conventional art, the method of inputting the information such as an acquisition source and an output destination of the image by the user is complicated, and the method of utilizing the registered information such as an acquisition source and an output destination is also complicated.

SUMMARY OF THE INVENTION

The present invention has been made to solve the above-described problems, and an object of the present invention is to provide an image processing apparatus which allows the user to readily register the information such as an acquisition source and an output destination of the image and also allows the user to readily use the registered information such as an acquisition source and an output destination, an image processing method, and a computer-readable recording medium recording an image processing program.

An image processing apparatus according to an aspect of the present invention includes a display; a memory for storing first information indicating an acquisition source of image data, second information indicating an editing process of the image data and third information indicating an output destination of the image data associated with one another as a setting information group; an accepting unit for accepting the first information to the third information; a display control unit for causing the display to display images used for accepting the first information to the third information in a first area to a third area, respectively; and a registration unit for, when the accepting unit accepts at least two pieces of information of the first information to the third information, registering the at least two pieces of information of the first information to the third information as the setting information group in the memory.

Preferably, the image processing apparatus further includes a reading unit for reading the setting information group from the memory in response to a first instruction. The display control unit causes the display to display the at least two pieces of information of the first information to the third information in at least two of the first area to the third area, respectively, based on the setting information group read by the reading unit.

Preferably, the image processing apparatus further includes an acquisition unit for acquiring the image data from the acquisition source corresponding to the first information.

Preferably, the image processing apparatus further includes an editing unit for editing the image data based on the editing process corresponding to the second information.

Preferably, the image processing apparatus further includes an output unit for outputting the image data to the output destination corresponding to the third information.

Preferably, the display control unit arranges the first area to the third area in an order in which the first information to the third information are accepted.

Preferably, when the accepting unit accepts the first information, the display control unit causes the display to display a plurality of selectable acquisition sources in the second area.

Preferably, when the accepting unit accepts the third information, the display control unit causes the display to display a plurality of selectable output destinations in the second area.

Preferably, the accepting unit accepts selection of a registration mode when accepting the first information to the third information. When the accepting unit accepts a first registration mode, the registration unit registers a new setting information group in the memory based on the at least two pieces of information of the first information to the third information, and, when the accepting unit accepts a second registration mode, the registration unit updates the setting information group in the memory based on the at least two pieces of information of the first information to the third information.

Preferably, when the accepting unit accepts the first information to the third information, the display control unit causes the display to display a message indicating that the setting information group is being registered.

Preferably, the display control unit causes the display to display the message in an area other than the first area to the third area.

Preferably, when the accepting unit has accepted the at least two pieces of information of the first information to the third information, the display control unit causes the display to display the at least two pieces of information in the second area. The accepting unit accepts a second instruction for specifying whether to store the at least two pieces of information as the setting information group.

Preferably, the display control unit causes the display to display an icon indicating each of the at least two pieces of information on the second area.

Preferably, the accepting unit accepts a third instruction for changing a display style of the icon. The display control unit causes the display to display the icon in the display style in accordance with the third instruction.

According to another aspect of the present invention, an image processing method in an image processing apparatus including a display and a memory is provided. The image processing method includes the steps of accepting first information indicating an acquisition source of image data, second information indicating an editing process of the image data and third information indicating an output destination of the image data; displaying images used for accepting the first information to the third information on a first area to a third area, respectively, of the display; and, when accepting at least two pieces of information of the first information to the third information, registering the at least two pieces of information of the first information to the third information as a setting information group in the memory.

Preferably, the image processing method further includes the steps of reading the setting information group from the memory in response to a first instruction, and displaying the at least two pieces of information of the first information to the third information in at least two of the first area to the third area, respectively, of the display based on the read setting information group.

Preferably, the image processing method further includes the step of acquiring the image data from the acquisition source corresponding to the first information.

Preferably, the image processing method further includes the step of editing the image data based on the editing process corresponding to the second information.

Preferably, the image processing method further includes the step of outputting the image data to the output destination corresponding to the third information.

According to another aspect of the present invention, a computer-readable recording medium recording an image processing program for causing an image processing apparatus including a display, a memory and a processor to perform image processing is provided. The image processing program causes the processor to perform the steps of accepting first information indicating an acquisition source of image data, second information indicating an editing process of the image data and third information indicating an output destination of the image data; displaying images used for accepting the first information to the third information in a first area to a third area, respectively, of the display; and, when accepting at least two pieces of information of the first information to the third information, registering the at least two pieces of information of the first information to the third information as a setting information group in the memory.

The present invention provides an image processing apparatus which allows the user to readily register the information such as an acquisition source and an output destination of the image and also allows the user to readily use the registered information such as an acquisition source and an output destination, an image processing method, and a computer-readable recording medium recording an image processing program.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a conceptual diagram showing a data structure of a setting information file stored in a memory.

FIG. 6 is a conceptual diagram showing a data structure of an input information file stored in the memory.

FIG. 7 is a conceptual diagram showing a data structure of an edit information file stored in the memory.

FIG. 8 is a conceptual diagram showing a data structure of an output information file stored in the memory.

FIG. 9 is a conceptual diagram showing a display at the time when an accepting unit accepts information from a user via a touch operation unit.

FIG. 10 is a conceptual diagram showing the display at the time when the accepting unit accepts an input of an acquisition source of image data via the touch operation unit.

FIG. 11 is a conceptual diagram showing the display at the time when the accepting unit accepts an input of an output destination via the touch operation unit.

FIG. 12 is a conceptual diagram showing the display which displays registered workflow information.

FIG. 18 is a conceptual diagram showing the screen at the time of selecting the acquisition source on the display of the image processing apparatus.

FIG. 19 is a conceptual diagram showing the screen at the time of selecting an image file on the display of the image processing apparatus.

FIG. 20 is a conceptual diagram showing the screen at the time of selecting the output destination on the display of the image processing apparatus.

FIG. 21 is a conceptual diagram showing the screen at the time of accepting an input indicating whether the workflow information can be registered or not.

DESCRIPTION OF THE PREFERRED EMBODIMENTS

Figure 1:
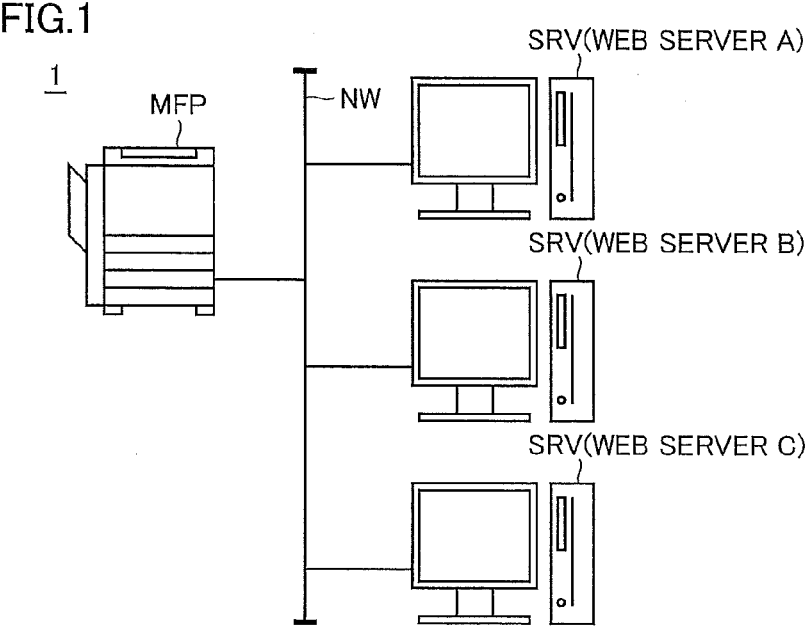
FIG. 1 is a schematic configuration diagram of an image processing system according to the present embodiment.

The embodiments of the present invention will be hereinafter described in detail with reference to the accompanying drawings, in which the same or corresponding components are designated by the same reference characters, and description thereof will not be repeated.

(Overall Configuration of Image Processing System)

FIG. 1 is a schematic configuration diagram of an image processing system 1 according to the present embodiment. Referring to FIG. 1, image processing system 1 is configured of an image processing apparatus MFP and a server apparatus SRV connected to image processing apparatus MFP via a network NW.

Image data and the like can be transmitted and received between server apparatus SRV and image processing apparatus MFP via network NW. The image data (image file) described herein represents, as document data, graphic data and photograph data, TIFF (Tagged-Image File Format) data, GIF (Graphics Interchange Format) data, PNG (Portable Network Graphics) data, JPEG (Joint Photographic Experts Group) data, PDF (Portable Document Format) data, and the like. Network NW may include private lines such as a LAN (Local Area Network) and a WAN (Wide Area Network), or public lines such as the Internet and a virtual private network, and may also be partially or wholly a wireless communication line such as a wireless LAN.

Image processing apparatus MFP generally serves as an MFP (Multi Function Peripheral) having a plurality of functions such as a copy function, a facsimile function and a scanner function. Image processing apparatus MFP acquires image data in accordance with the user operation. It is to be noted that "acquisition of image data" represents operations including, for example, reading the image data stored in server apparatus SRV, reading the image data stored in a BOX of its own storage device (storage region), reading a document to generate new image data, and the like.

Furthermore, image processing apparatus MFP edits the image data in accordance with the user operation. It is to be noted that "edit of image data" represents operations including, for example, changing the storing format of the image data, connecting the image data, and the like.

Furthermore, image processing apparatus MFP outputs the edited image data in accordance with the user operation. It is to be noted that "output of image data" described herein represents operations including, for example, storing the image data in the server apparatus, storing the image data in the BOX of its own storage device, transmitting the image data by facsimile, transmitting the image data attached to an e-mail message, printing the image on the paper medium based on the image data, and the like.

(Hardware Configuration of Image Processing Apparatus MFP)

Figure 2:
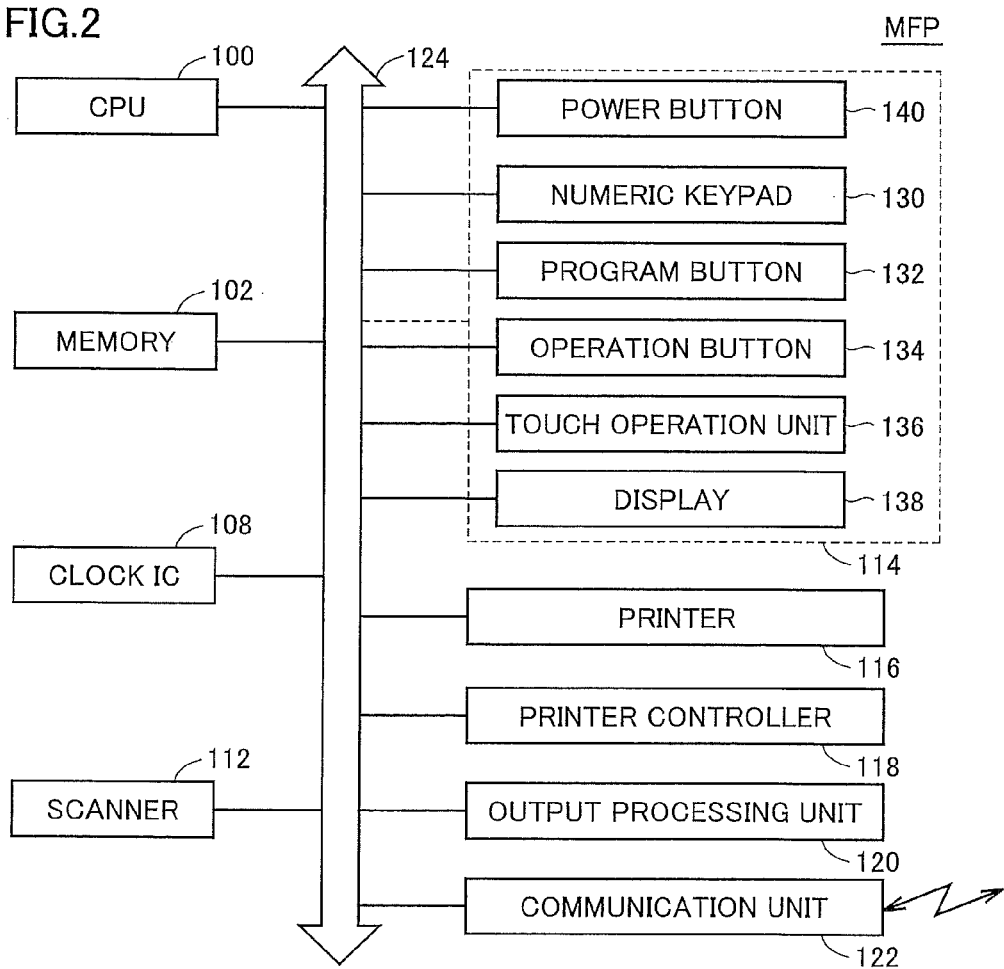
FIG. 2 is a schematic diagram showing a hardware configuration of an image processing apparatus according to the present embodiment.

FIG. 2 is a schematic diagram showing the hardware configuration of image processing apparatus MFP according to the present embodiment.

Referring to FIG. 2, image processing apparatus MFP includes a CPU (Central Processing Unit) 100, a memory 102, and a clock IC (Integrated Circuit) 108. These components are connected to one another through a bus 124. It is to be noted that memory 102 is configured of a ROM (Read Only Memory), an S-RAM (Static-Random Access Memory), an NV-RAM (Non-Volatile Random Access Memory), an HDD (Hard Disk Drive), and the like.

CPU 100 reads the program stored in advance in the ROM, HDD or the like constituting a nonvolatile memory of memory 102 onto the S-RAM constituting a working memory of memory 102 and executes the program, to thereby implement the image processing according to the present embodiment. It is to be noted that memory 102 consisting of the HDD and the like can store a relatively large amount of data in a nonvolatile manner, and can also store the image data received by a communication unit 122 described below from server apparatus SRV, the image data acquired by a scanner 112 described below reading an image, and the like. Clock IC 108 is configured to include a crystal oscillator and the like to measure the current time.

Furthermore, image processing apparatus MFP includes a scanner 112, an operation panel 114, a printer 116, a printer controller 118, and an output processing unit 120.

Scanner 112 reads documents and generates image data. Scanner 112 generally includes a document tray for setting documents, a platen glass, a feeding unit for automatically feeding the documents placed on the document tray to the platen glass sheet by sheet, and a document ejection tray for ejecting the read documents (all not shown).

Printer 116 prints the image on the paper medium and the like based on the image data. Printer 116 includes an image forming unit consisting of an exposing unit, a developing roller and the like, a transfer roller for transferring the toner image formed in the image forming unit onto the paper medium, a fixing unit for fixing the transferred toner image, a control circuit for controlling the operation in each unit, and the like.

Printer controller 118 converts the image data from server apparatus SRV and the personal computer, the image data in the BOX, and the image data from scanner 112 into print data suitable for the print processing by printer 116. In the case where image processing apparatus MFP operates in color mode, printer controller 118 converts the image data into raster data of four colors including yellow (Y), magenta (M), cyan (C), and black (K), and outputs the raster data of each color to printer 116.

Output processing unit 120 serving to carry out the processes for the paper medium obtained after being subjected to the image proceeding in printer 116 typically carries out a "sorting process", a "grouping process", a "stapling process", a "punching process", and the like. The "sorting process" described herein means the so-called collation printing. The "grouping process" means a process of outputting a specified number of multiple copies of the paper medium on a per-page basis. Furthermore, the "stapling process" means a process of stapling the output paper medium with a staple. The "punching process" means a process of punching a hole for stapling in the output paper medium.

Furthermore, image processing apparatus MFP includes a communication unit 122 implemented by a network interface and the like. Communication unit 122 serves to transmit and receive the image data and the like to and from a personal computer and server apparatus SRV via network NW.

Figure 3:
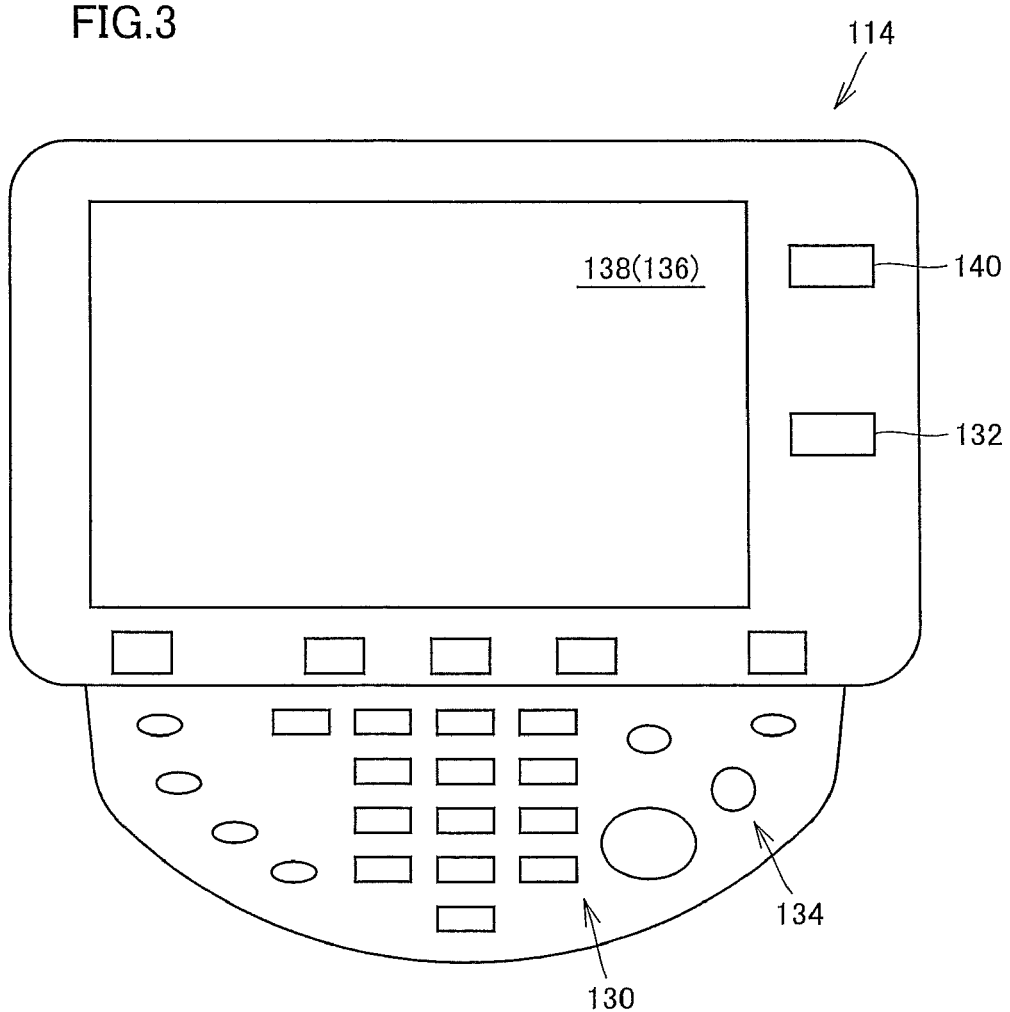
FIG. 3 is a schematic diagram showing an operation panel according to the present embodiment.

FIG. 3 is a schematic diagram showing operation panel 114 according to the present embodiment. As shown in FIGS. 2 and 3, operation panel 114 includes a numeric keypad 130, a program button 132, an operation button 134, a touch operation unit 136, a display 138, and a power button 140. Operation panel 114 is disposed in a position on the upper portion of image processing apparatus MFP to facilitate the user operation. Display 138 is configured, for example, of a liquid crystal panel and the like. Touch operation unit 136 is disposed on the display surface of display 138. Display 138 and touch operation unit 136 constitute a touch panel.

(Function Configuration of Image Processing Apparatus MFP)

Figure 4:
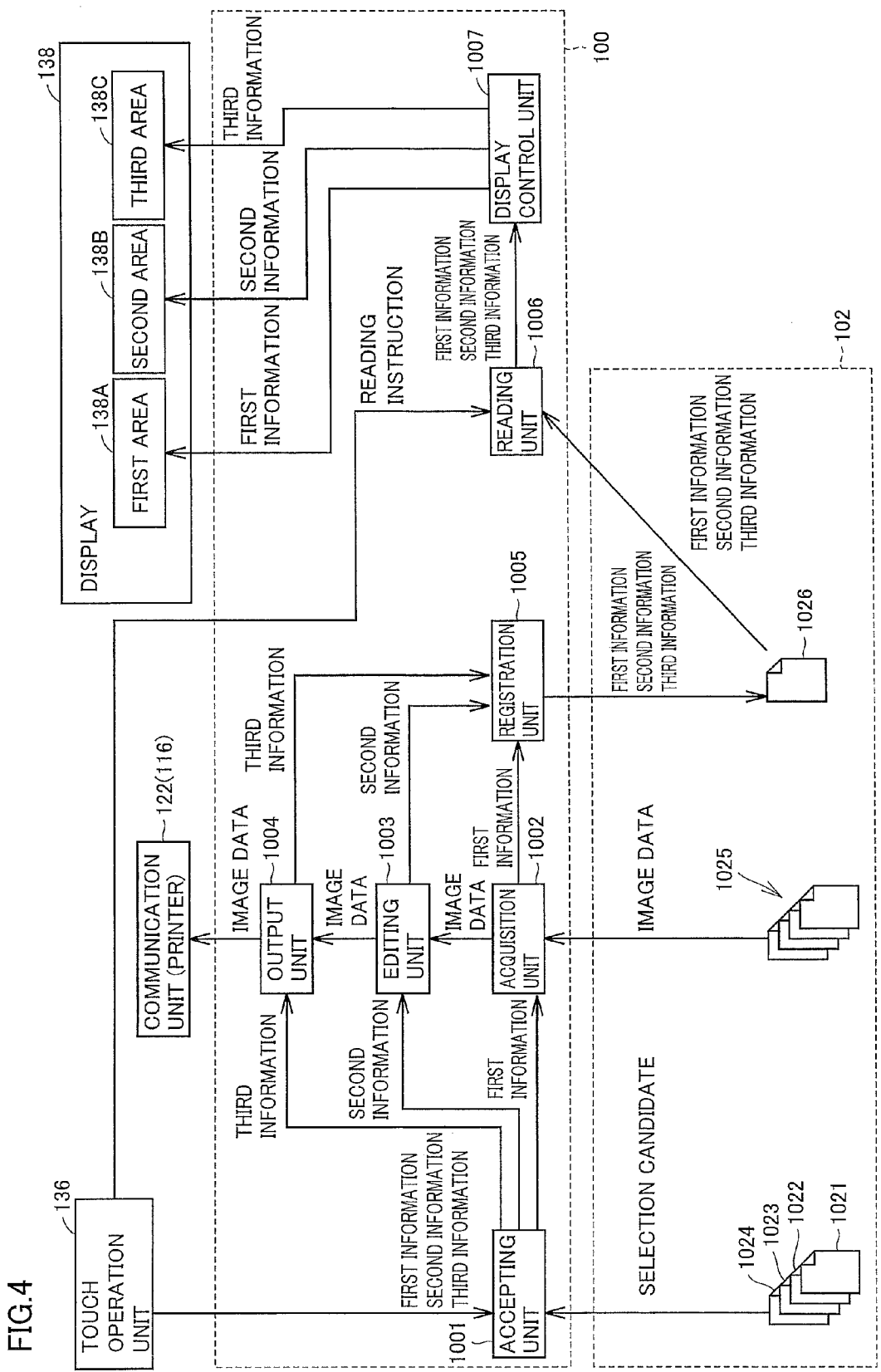
FIG. 4 is a block diagram showing a function configuration of the image processing apparatus according to the present embodiment.

The function configuration of image processing apparatus MFP will then be described in detail. FIG. 4 is a block diagram showing the function configuration of image processing apparatus MFP according to the present embodiment. Referring to FIG. 4, image processing apparatus MFP includes an accepting unit 1001, an acquisition unit 1002, an editing unit 1003, an output unit 1004, a registration unit 1005, a reading unit 1006, and a display control unit 1007. As described above, image processing apparatus MFP also includes touch operation unit 136, display 138 and memory 102.

Accepting unit 1001, acquisition unit 1002, editing unit 1003, output unit 1004, registration unit 1005, reading unit 1006, and display control unit 1007 are implemented by CPU 100 reading the program previously stored in the ROM, the HDD and the like onto the S-RAM for execution. In other words, accepting unit 1001, acquisition unit 1002, editing unit 1003, output unit 1004, registration unit 1005, reading unit 1006, and display control unit 1007 perform functions as with those achieved by CPU 100 of image processing apparatus MFP.

Each of the function blocks included in image processing apparatus MFP will be hereinafter described in detail. First, memory 102 implemented by the S-RAM, the HDD and the like stores a setting information file 1021, an input information file 1022, an edit information file 1023, and an output information file 1024. Memory 102 stores each of a plurality of pieces of image data 1025, for example, in a specified BOX. Memory 102 stores a workflow information file 1026 storing the first information showing the acquisition source of image data 1025 set based on input information file 1022, the second information showing the method of editing image data 1025 set based on edit information file 1023, and the third information showing the output destination of image data 1025 set based on output information file 1024 which are associated with one another for each workflow.

FIG. 5 is a conceptual diagram showing the data structure of setting information file 1021 stored in memory 102. Setting information file 1021 stores the setting information which is a basic information unit for registering a plurality of pieces of workflow information (setting information group). Setting information file 1021 includes a workflow number and a workflow name for identifying the workflow, a reference permission group, and the like.

FIG. 6 is a conceptual diagram showing the data structure of input information file 1022 stored in memory 102. Input information file 1022 stores the information which shows the type of the storage medium storing image data 1025. For example, input information file 1022 stores the data showing as to whether image data 1025 is acquired by scanning, acquired from the BOX on the HDD which is a component of memory 102, or acquired from the external storage medium via network NW. Furthermore, input information file 1022 also contains acquisition conditions and the like for acquiring the image data.

FIG. 7 is a conceptual diagram showing the data structure of edit information file 1023 stored in memory 102. Edit information file 1023 stores the information concerning a file format, page setting, an order of connecting images, page transfer, page rotation, page deletion, and the like of image data 1025.

FIG. 8 is a conceptual diagram showing the data structure of output information file 1024 stored in memory 102. Output information file 1024 stores the information showing the types of the method of outputting image data 1025. For example, output information file 1024 stores the data showing as to whether an image is printed on the paper medium based on image data 1025 or image data 1025 is transmitted to a different communication device. Furthermore, output information file 1024 also contains the setting conditions for each output.

Referring to FIGS. 4 and 5, accepting unit 1001 accepts a workflow number, a workflow name and the like for each piece of workflow information based on setting information file 1021. In other words, when accepting unit 1001 registers new workflow information and updates the existing workflow information, it prompts the user to input the workflow number and the workflow name via display control unit 1007 and display 138 described below. Accepting unit 1001 then accepts the workflow number and the workflow name from the user via touch operation unit 136.

FIG. 9 is a conceptual diagram showing display 138 at the time when accepting unit 1001 accepts an input of the information from the user via touch operation unit 136. Referring to FIGS. 4, 6 and 9, accepting unit 1001 accepts an input of the acquisition source of image data 1025 for each piece of workflow information based on input information file 1022. It is to be noted that the acquisition source of image data 1025 includes the address of the BOX of the external apparatus storing image data 1025, the information indicating the method for acquiring image data 1025, and the like, which are collectively referred to as first information. Thus, in the case where new workflow information is registered and the existing workflow information is updated, display control unit 1007 prompts the user to input the acquisition source of image data 1025 via display 138.

More specifically, display 138 includes an acquisition source selection area 138A (the first area) on the left side. Display control unit 1007 arranges acquisition source selection area 138A on the left side of display 138 and causes a plurality of icons showing the acquisition source of image data 1025 to be displayed on acquisition source selection area 138A in such a manner that the icons can be selected. Consequently, accepting unit 1001 accepts an input of the acquisition source of image data 1025 from the user via touch operation unit 136.

FIG. 10 is a conceptual diagram showing display 138 at the time when accepting unit 1001 accepts an input of the acquisition source of image data 1025 via touch operation unit 136. As shown in FIG. 10, when accepting unit 1001 accepts the selection of the acquisition source displayed on acquisition source selection area 138A from the user, display control unit 1007 causes icons for accepting the more specific acquisition source to be displayed on an editing area 138B (the second area) and an output destination selection area 138C (the third area) of display 138 in such a manner that the icons can be selected.

The user can determine the acquisition source of image data 1025 by selecting the desired BOX and pressing an OK button 1381. The user can also cancel the selection process of the acquisition source of image data 1025 by pressing a cancel button 1382. When the acquisition source of image data 1025 is determined, accepting unit 1001 accepts new selection of the acquisition source, the editing process and the output destination by causing display control unit 1007 to proceed to display the screen shown in FIG. 9.

Referring to FIGS. 4, 7 and 9, accepting unit 1001 accepts an input of the editing process of image data 1025 for each piece of the workflow information based on edit information file 1023. It is to be noted that the editing process of image data 1025 includes a file format, page setting, change in the order of connecting images, image extraction, image deletion, and the like. These editing process are also referred to as second information. Thus, in the case where new workflow information is registered and the existing workflow information is updated, display control unit 1007 prompts the user to input the editing process of image data 1025 via display 138.

More specifically, display 138 includes editing area 138B in the center section in the lateral direction. Display control unit 1007 arranges editing area 138B in the center section in the lateral direction on display 138 and causes an icon showing the editing process of image data 1025 to be displayed on editing area 138B in such a manner that the icon can be selected. Consequently, accepting unit 1001 accepts an input of the editing process of image data 1025 from the user via touch operation unit 136.

Referring to FIGS. 4, 8 and 9, accepting unit 1001 accepts an input of the output destination of image data 1025 for each piece of workflow information based on output information file 1024. The output destination of image data 1025 includes the address of the output destination of image data 1025, the information indicating the method of outputting image data 1025, and the like, which are collectively referred to as third information. Thus, in the case where new workflow information is registered and the existing workflow information is updated, display control unit 1007 prompts the user to input the output destination of image data 1025 via display 138.

More specifically, display 138 has a section on its right side displaying output destination selection area 138C. Display control unit 1007 causes output destination selection area 138C to be displayed on the right side of display 138, for displaying a plurality of icons showing the output destination on output destination selection area 138C in such a manner that the icons can be selected. Accepting unit 1001 accepts an input of the output destination of image data 1025 from the user via touch operation unit 136.

FIG. 11 is a conceptual diagram showing display 138 at the time when accepting unit 1001 accepts an input of the output destination of image data 1025 via touch operation unit 136. As shown in FIG. 11, when accepting unit 1001 accepts selection of the output destination displayed on output destination selection area 138C from the user, display control unit 1007 causes icons for accepting the more specific output destination to be displayed on acquisition source selection area 138A and editing area 138B of display 138 in such a manner that the icons can be selected.

For example, when the user selects the icon showing the destination list on output destination selection area 138C, display control unit 1007 causes a plurality of icons each showing the transmission destination of an e-mail message to be displayed on acquisition source selection area 138A and editing area 138B in such a manner that the icons can be selected. In other words, accepting unit 1001 accepts the transmission destination of the e-mail message as an output destination. The user can determine the output destination of image data 1025 by selecting the transmission destination of the e-mail message and pressing OK button 1381. On the other hand, the user can also cancel the process of selecting the output destination of image data 1025 by pressing cancel button 1382. When the output destination of image data 1025 is determined, accepting unit 1001 accepts new selection of the acquisition source, the editing process and the output destination by causing display control unit 1007 to proceed to display the screen shown in FIG. 9.

As described above, in image processing apparatus MFP according to the present embodiment, accepting unit 1001 and display control unit 1007 cause a plurality of icons showing the acquisition source of image data 1025 to be displayed via touch operation unit 136 and display 138 on acquisition source selection area 138A based on input information file 1022 in such a manner that the icons can be selected. Furthermore, accepting unit 1001 and display control unit 1007 cause a plurality of icons showing the editing process to be displayed via touch operation unit 136 and display 138 on editing area 138B based on edit information file 1023 in such a manner that the icons can be selected. Furthermore, accepting unit 1001 and display control unit 1007 cause a plurality of icons showing the output destination to be displayed via touch operation unit 136 and display 138 on output destination selection area 138C based on output information file 1024 in such a manner that the icons can be selected.

Consequently, the user can input (register) the acquisition source of image data 1025, the editing process for image data 1025 and the output destination of image data 1025 on the same screen, that is, without changing the screen. In other words, the user can intuitively input the input destination, the editing process and the output destination of the image data.

Furthermore, areas 138A-138C are arranged such that the input operation is performed from the left to the right on the screen in line with the flow along which the user inputs the first information to the third information. This eliminates the need for the user to think about the information to be subsequently input. Although, in the above description, areas 138A to 138C are arranged in the left section, the center section and the right section, respectively, of the screen, the arrangement is not limited thereto. The areas may be arranged so as to prompt the user to input the next information from the upper section toward the lower section on the screen in accordance with the input operation.

Referring to FIG. 4, acquisition unit 1002 acquires image data 1025 from the specified acquisition source. For example, acquisition unit 1002 acquires image data 1025 from the storage medium of a different server apparatus SRV via network NW, reads image data 1025 from its own memory 102, and causes scanner 112 to generate image data 1025.

Editing unit 1003 edits image data 1025. For example, editing unit 1003 changes the file format of image data 1025, connects image data 1025, and deletes a part of the image data.

Output unit 1004 outputs image data 1025 to the specified output destination. For example, output unit 1004 stores image data 1025 in the storage medium of a different server apparatus SRV via communication unit 122 and network NW, causes printer 116 to print the image on the paper medium based on image data 1025, and stores image data 1025 in its own memory 102.

Registration unit 1005 registers, in workflow information file 1026, the first information, the second information and the third information accepted by accepting unit 1001 which are associated with one another as one piece of workflow information. When accepting unit 1001 has accepted at least two or more pieces of information of the first information, the second information and the third information, registration unit 1005 according to the present embodiment registers the two or more pieces of information accepted by accepting unit 1001 as one piece of workflow information.

In other words, registration unit 1005 serves as a determination unit for determining whether accepting unit 1001 has accepted at least two or more pieces of information of the first information, the second information and the third information. Registration unit 1005 registers the two or more pieces of information accepted by accepting unit 1001 as one record in workflow information file 1026.

More specifically, in the case where accepting unit 1001 has accepted a new workflow number and workflow name as setting information (the first registration mode), registration unit 1005 adds two or more pieces of information of the first information to the third information accepted by accepting unit 1001 as new workflow information to workflow information file 1026. On the other hand, in the case where accepting unit 1001 has accepted selection of the existing workflow information (the second registration mode), registration unit 1005 updates the appropriate workflow information in workflow information file 1026 based on the two or more pieces of information accepted by accepting unit 1001.

Reading unit 1006 receives a reading instruction from the user to read the workflow information from memory 102. More specifically, reading unit 1006 reads the corresponding workflow information from workflow information file 1026 of memory 102 in accordance with the workflow number and the workflow name that are input via touch operation unit 136.

FIG. 12 is a conceptual diagram showing display 138 which displays the registered workflow information. As shown in FIGS. 4 and 12, display control unit 1007 causes the first information of the workflow information read by reading unit 1006 to be displayed on acquisition source selection area 138A. Display control unit 1007 causes the second information of the workflow information read by reading unit 1006 to be displayed on editing area 138B. Display control unit 1007 causes the third information of the workflow information read by reading unit 1006 to be displayed on output destination selection area 138C.

Furthermore, in image processing apparatus MFP according to the present embodiment, accepting unit 1001 is configured to be able to accept the change instruction for changing the display style of the icon. More specifically, memory 102 stores, for example, an image of the icon showing a paper file, an image of the icon showing a BOX which accommodates a file, a photograph image for each user, and the like as a display style of the icon. In response to the instruction from the user, accepting unit 1001 and display control unit 1007 cause display 138 to display the icons based on their respective images in such a manner that the icons can be selected, and then, accepting unit 1001 accepts the change instruction.

Display control unit 1007 causes icons to be displayed on areas 138A, 138B and 138C of display 138 in the display style in accordance with the change instruction. For example, as described below, display control unit 1007 causes the icon showing each of two or more pieces of information input by the user among the acquisition source, the editing process and the output destination (the first information to the third information) on editing area 138B in the display style in accordance with the change instruction.

As described above, image processing apparatus MFP according to the present embodiment, reading unit 1006 and display control unit 1007 cause display 138 to display the first information showing an acquisition source on acquisition source selection area 138A, to display the second information indicating an editing process on editing area 138B, and to display the third information indicating an output destination on output destination selection area 138C. This allows the user to grasp the combination of the registered acquisition source, editing process and output destination (workflow information) on the single screen, that is, without changing the screen. Furthermore, since the positions, in which the acquisition source, the editing process and the output destination are displayed on the screen at the time when these acquisition source, editing process and output destination are registered, correspond with the positions, in which the acquisition source, the editing process and the output destination are displayed on the screen at the time when the registration contents concerning these acquisition source, editing process and output destination are displayed, respectively, the user can intuitively (readily) grasp the combination of the registered acquisition source, editing process and output destination.

In image processing apparatus MFP according to the present embodiment, when registration unit 1005 registers the workflow information, display control unit 1007 causes the message to be displayed on the area other than acquisition source selection area 138A, editing area 138B and output destination selection area 138C of display 138 indicating that the workflow information is being registered. For example, as shown in FIGS. 10 and 11, display control unit 1007 causes the icon to be displayed on the display area above editing area 138B, which shows a message of "under registration" or explicitly indicates that the information is being registered.

Consequently, the positions, in which the acquisition source, the editing process and the output destination are displayed on the screen at the time when these acquisition source, editing process and output destination are registered, correspond with the positions, in which the acquisition source, the editing process and the output destination are displayed on the screen at the time when the registered workflow information is read, respectively, and the user can easily grasp whether the screen for registering the workflow information is displayed or the screen showing the registered workflow information is read is displayed.

<Workflow Registration Edit Process>

Figure 13:
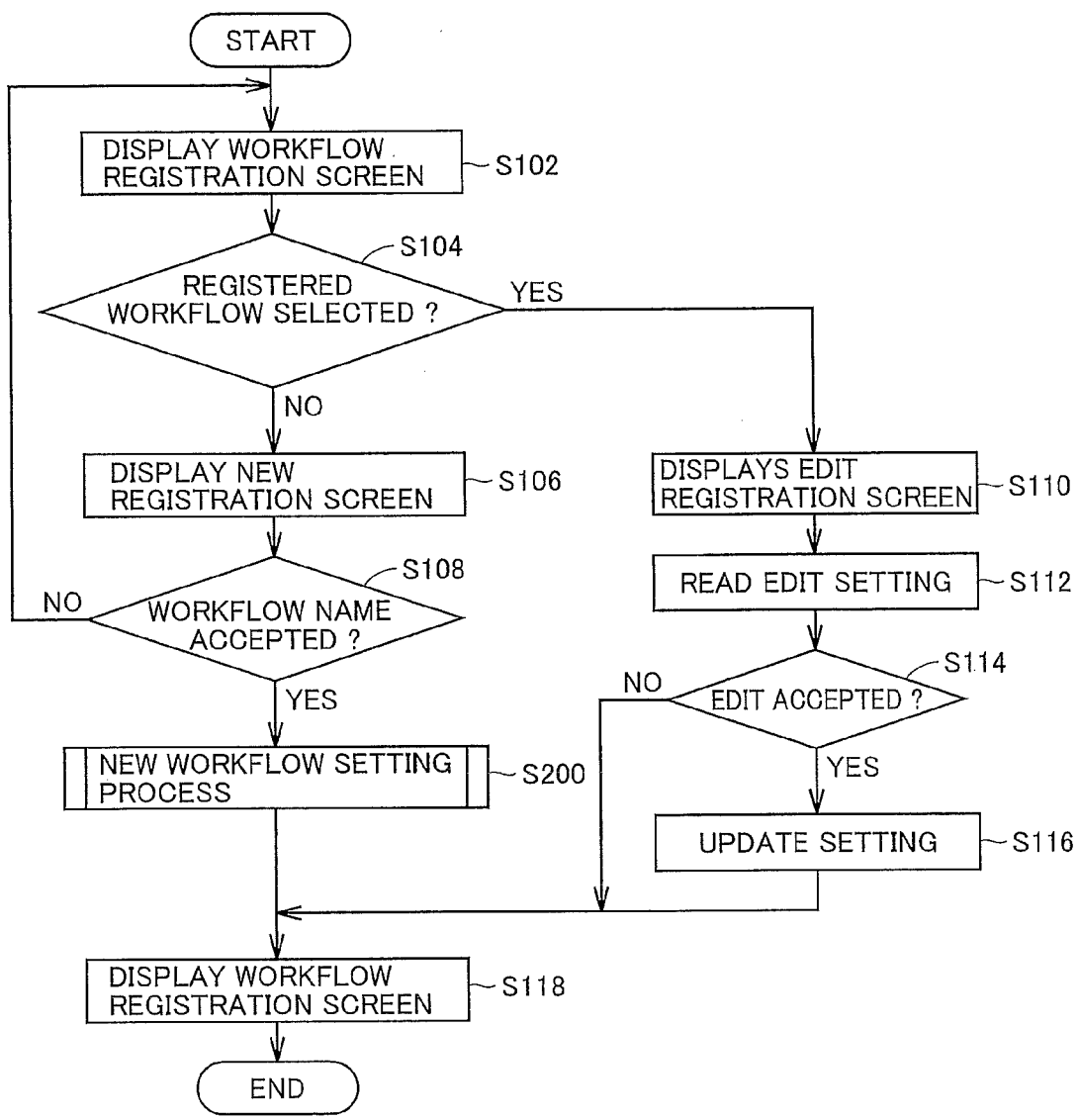
FIG. 13 is a flowchart showing a procedure of a workflow registration edit process in the image processing apparatus.
Figure 14:
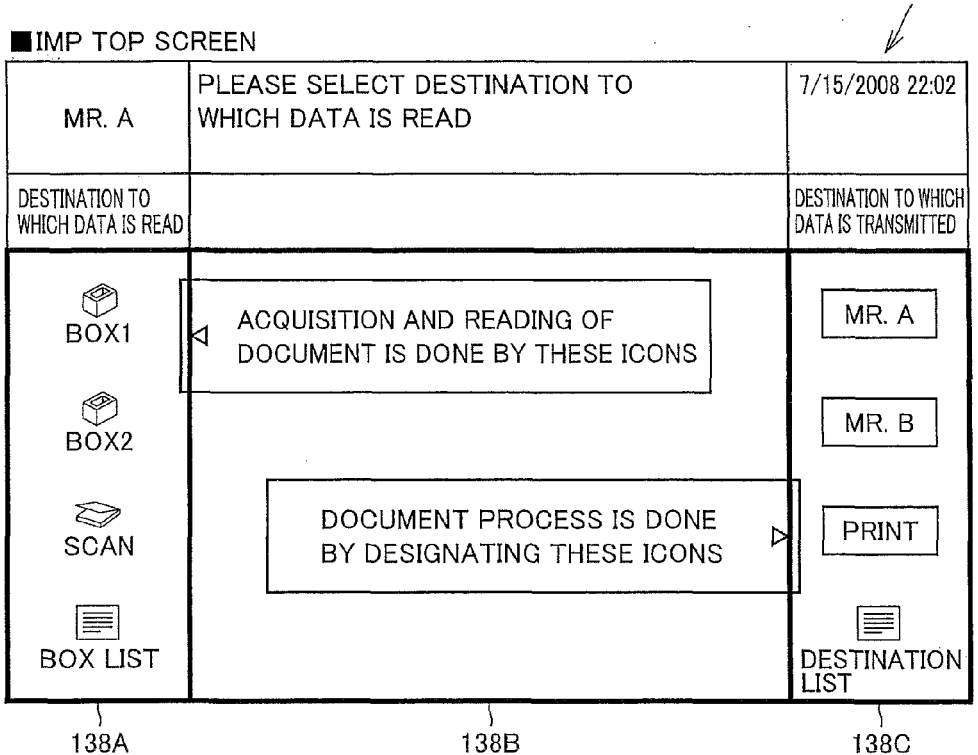
FIG. 14 is a conceptual diagram showing a top screen on the display of the image processing apparatus.
Figure 15:
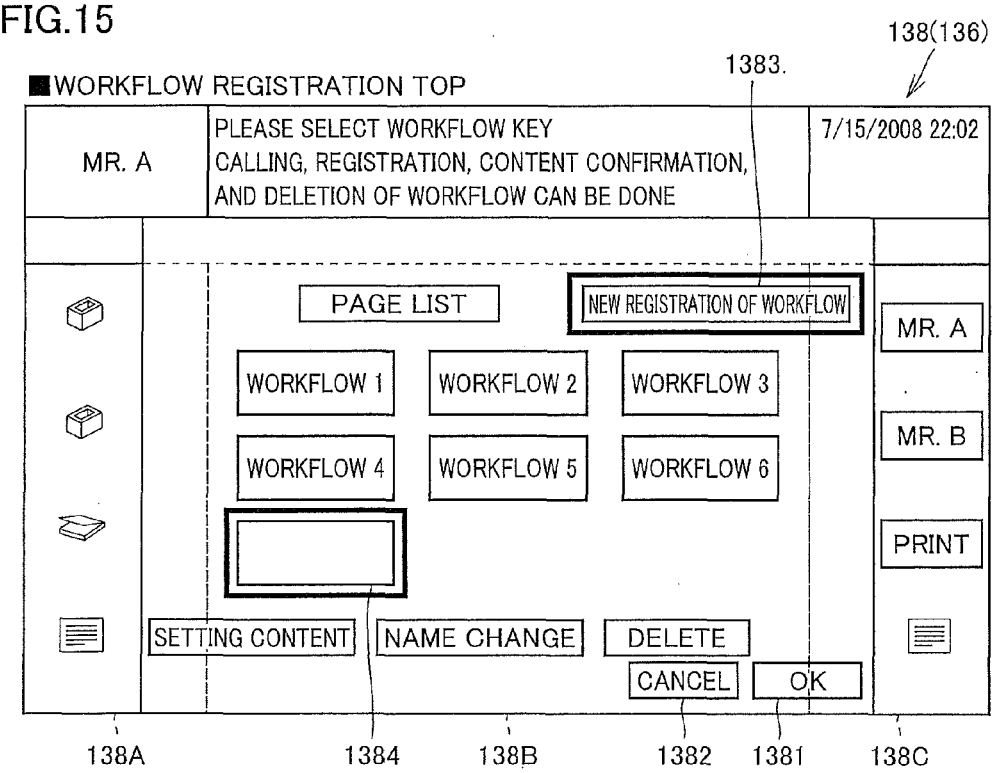
FIG. 15 is a conceptual diagram showing the top screen of the workflow registration on the display of the image processing apparatus.
Figure 16:
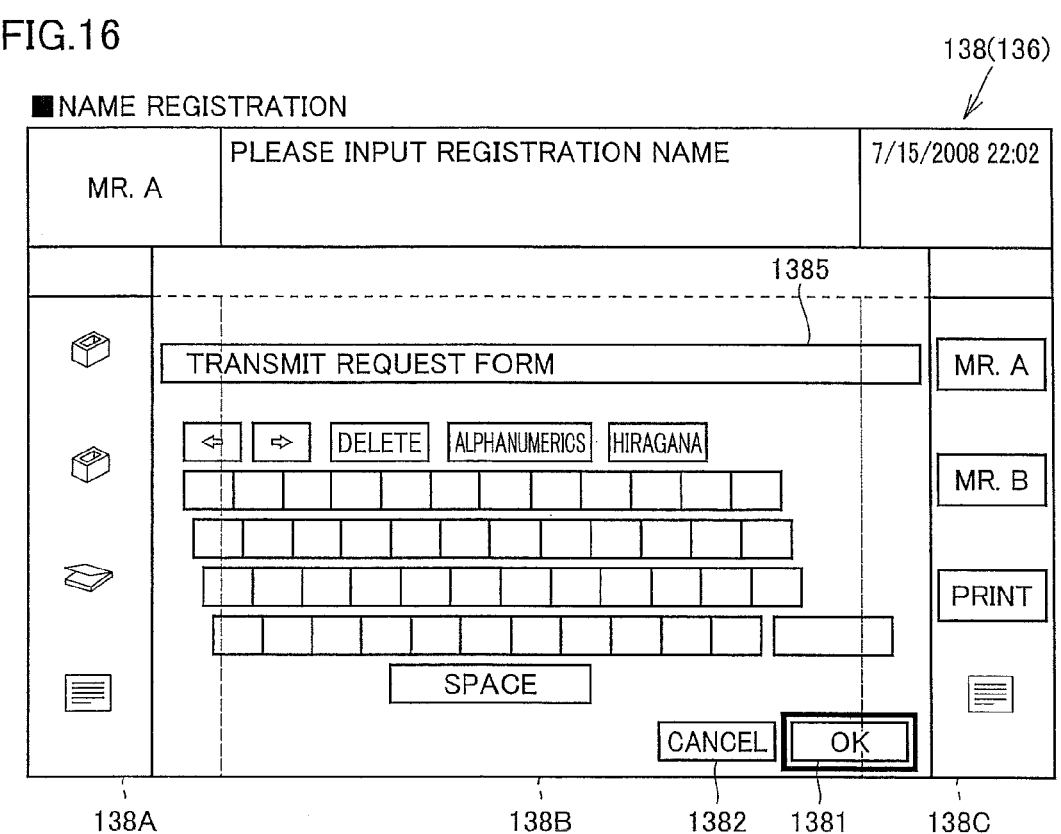
FIG. 16 is a conceptual diagram showing the registration screen for a workflow name on the display of the image processing apparatus.

The procedure of the workflow registration edit process will be hereinafter described mainly with reference to FIGS. 2 and 13. It is to be noted that FIG. 13 is a flowchart showing the procedure of the workflow registration edit process in image processing apparatus MFP. FIG. 14 is a conceptual diagram showing the top screen on display 138 of image processing apparatus MFP. FIG. 15 is a conceptual diagram showing the top screen of the workflow registration on display 138 of image processing apparatus MFP. FIG. 16 is a conceptual diagram showing the registration screen for the workflow name on display 138 of image processing apparatus MFP.

CPU 100 first causes the registration screen for the workflow information to be displayed (step S102). More specifically, when display 138 of image processing apparatus MFP displays the top screen shown in FIG. 14, the user presses program button 132 shown in FIG. 3, which causes CPU 100 to display the screen shown in FIG. 15 on display 138.

CPU 100 determines whether the registered workflow information is selected or not (step S104). If the registered workflow information is not selected (NO in step S104), that is, when a new registration button 1383 for the workflow information in FIG. 15 is pressed, CPU 100 causes the registration screen for the workflow name shown in FIG. 16 to be displayed (step S106) (the first registration mode).

Referring to FIGS. 13 and 16, CPU 100 determines whether the workflow name is accepted or not (step S108). In other words, CPU 100 accepts a new workflow name via the software keyboard and the like implemented by touch operation unit 136 and display 138.

If the workflow name is not accepted (NO in step S108), that is, when cancel button 1382 is pressed, CPU 100 repeats the processes from step S102. On the other hand, if the workflow name is accepted (YES in step S1108), that is, if OK button 1381 is pressed in the state where the accepted workflow name is displayed on a new workflow name display column 1385, CPU 100 performs the new workflow setting process (step S200).

The new workflow setting process (step S200) will be described below. After the new workflow setting process (step S200) is completed, CPU 100 causes the top screen for the workflow registration shown in FIG. 15 to be displayed on display 138 (step S118).

On the other hand, if the registered workflow information is selected (YES in step S104), that is, when an existing workflow button 1384 in FIG. 15 is pressed, CPU 100 causes an edit registration screen to be displayed (step S110) (the second registration mode). More specifically, CPU 100 reads the workflow information corresponding to the selected workflow name from workflow information file 1026. Then, as shown in FIG. 12, in the state where the acquisition source and the document to be acquired are selected in acquisition source selection area 138A and editing area 138B, and the state where the output destination is selected in output destination selection area 138C, CPU 100 causes the workflow information to be displayed on display 138 (S112).

CPU 100 then accepts the instruction to update any of the first information to the third information included in the workflow information (step S114). When CPU 100 accepts the instruction to update any of the first information to the third information (YES in step S114), CPU 100 updates the appropriate information of the workflow information (step S116) and causes the top screen for registering the workflow information shown in FIG. 15 to be displayed on display 138 (step S118).

On the other hand, when CPU 100 does not accept the instruction to update the existing workflow (NO in step S114), it causes the top screen for registering the workflow information shown in FIG. 15 to be displayed on display 138 (step S118).

However, instead of displaying the top screen for registering the workflow information, CPU 100 may perform the image processing based on the workflow information corresponding to the selected workflow name. In other words, CPU 100 may acquire an image based on the first information included in the workflow information, edit the image based on the second information and output the image based on the third information.

<New Workflow Setting Process>

Figure 17:
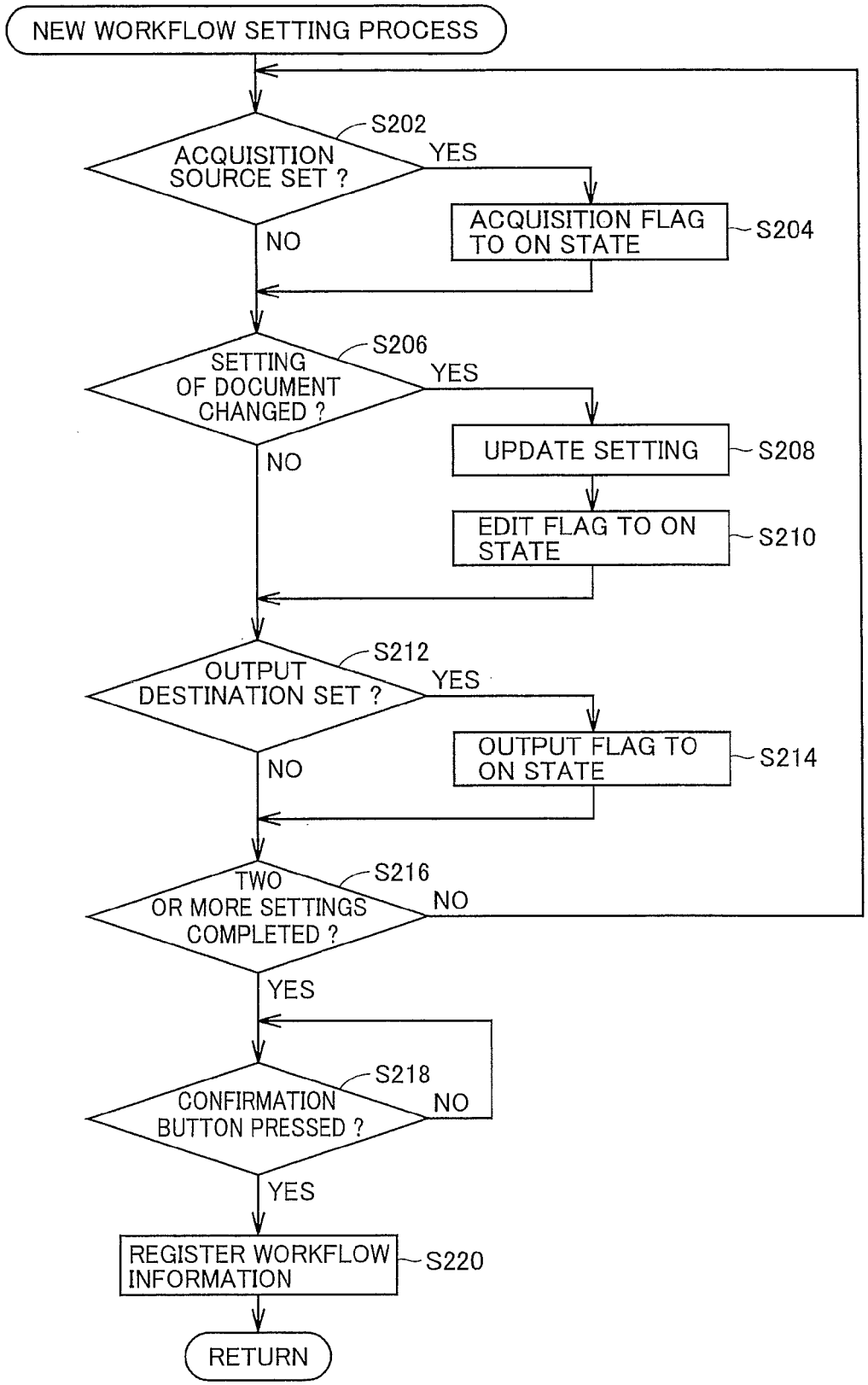
FIG. 17 is a flowchart showing the procedure of a new workflow setting process in the image processing apparatus.

FIG. 17 is a flowchart showing the procedure of the new workflow setting process in image processing apparatus MFP. FIG. 18 is a conceptual diagram showing the screen at the time of selecting the acquisition source on display 138 of image processing apparatus MFP. FIG. 19 is a conceptual diagram showing the screen at the time of selecting the image file on display 138 of image processing apparatus MFP. FIG. 20 is a conceptual diagram showing the screen at the time of selecting the output destination on display 138 of image processing apparatus MFP. FIG. 21 is a conceptual diagram showing the screen at the time of accepting an input indicating whether the workflow information can be registered or not.

As shown in FIG. 17, when the workflow name is input (YES in step S108), CPU 100 initializes an acquisition flag, an edit flag and an output flag of memory 102. In other words, CPU 100 sets the acquisition flag, the edit flag and the output flag to an OFF state.

CPU 100 then accepts the setting concerning the acquisition source of image data 1025 (step S202). More specifically, CPU 100 causes the acquisition source selection screen shown in FIG. 18 to be displayed on display 138, to accept the designation of the BOX storing image data 1025 and the designation to scan the document via touch operation unit 136 from the user.

For example, when the user presses the button for displaying a read list, as shown in FIG. 19, CPU 100 causes image files X, Y and Z to be displayed on editing area 138B in such a manner that the files can be selected. If CPU 100 accepts the setting concerning the acquisition source of image data 1025 (YES in step S202), that is, when OK button 1381 in FIG. 19 is pressed, CPU 100 sets the acquisition flag of memory 102 to an ON state (step S204) and performs the processes from step S206. In the case where cancel button 1382 in FIG. 19 is pressed and in the case where OK button 1381 is pressed in the state where the acquisition source is not selected, CPU 100 also performs the processes from step S206.

CPU 100 determines whether the editing process concerning image data 1025 is input or not (step S206). If CPU 100 accepts the editing process concerning image data 1025 (YES in step S206), CPU 100 temporarily stores the editing process in memory 102 (step S208). CPU 100 sets the edit flag to an ON state (step S210) and performs the processes from step S212. In the case where the editing process is not input, CPU 100 also performs the processes from step S212.

CPU 100 accepts the setting concerning the output destination of image data 1025 (step S212). More specifically, CPU 100 causes the output destination selection screen shown in FIG. 20 to be displayed on display 138 to accept the designation of the BOX storing image data 1025 and the designation to perform the print process based on image data 1025 from the user via touch operation unit 136. For example, the user may specify the BOX having a name of "Mr. B", may press the destination list to designate the transmission destination of the e-mail message, or the like.

If CPU 100 accepts the setting concerning the acquisition source of image data 1025 (YES in step S212), that is, when OK button 1381 in FIG. 20 is pressed, CPU 100 sets the output flag of memory 102 to an ON state (step S214) and performs the processes from step S216. In the case where cancel button 1382 in FIG. 20 is pressed and in the case where OK button 1381 is pressed in the state where the output destination is not selected, CPU 100 also performs the processes from step S216.

CPU 100 then refers to the acquisition flag, the edit flag and the output flag of memory 102 to determine whether two or more pieces of information of the acquisition source, the editing process and the output destination (the first information to the third information) are input or not (step S216). If the two or more pieces of information are not input (NO in step S216), CPU 100 repeats the processes from step S202.

On the other hand, if the two or more pieces of information are input (YES in step S216), CPU 100 causes a registration confirmation screen shown in FIG. 21 to be displayed on display 138 to accept an input indicating whether the workflow information can be registered or not (step S218). At this time, CPU 100 serving as display control unit 1007 causes the icon to be displayed on editing area 138B which shows each of the two or more pieces of information of the acquisition source, the editing process and the output destination (the first information to the third information) that are input by the user. Then, when a workflow registration button 1386 is pressed (YES in step S218), CPU 100 serving as accepting unit 1001 adds the first information to the third information input in steps S202, S206 and S212 as one piece of workflow information to workflow information file 1026 of memory 102 (step S220), and completes the new workflow setting process.

[Other Embodiments]

The program according to the present invention may read a required module of the program modules provided as a part of an operating system (OS) of the computer in a predetermined arrangement in a predetermined timing to execute the process. In this case, the above-described module is not included in the program itself which cooperates with the OS to execute the process. The program which does not include such a module may also be included in the program according to the present invention.

Furthermore, the program according to the present invention may be incorporated in a part of another program. Also in this case, the module included in another program described above is not included in the program itself, which cooperates with another program to execute the process. The program incorporated in another program as described above may also be included in the program according to the present invention.

The program product provided herein is installed in the program storing unit such as a hard disk for execution. It is to be noted that the program product includes a program itself and a storage medium in which the program is stored.

Furthermore, a part or all of the functions implemented by the program according to the present invention may be configured with dedicated hardware.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image processing apparatus comprising:
a display;
an accepting unit including:
a first accepting unit for accepting an input of first information indicating an acquisition source of an image;
a second accepting unit for accepting an input of second information indicating an editing process of said image;
a third accepting unit for accepting an input of third information indicating an output destination of said image;
a display control unit for causing said display to concurrently display first, second and third mutually exclusive areas corresponding to the first, second, and third accepting units, respectively, so that said first, second and third mutually exclusive areas are arranged relative to one another in a sequence the corresponds to an input operation by a user sequentially inputting the first information to the third information, wherein said first area displays at least one icon that is selectable by a user to designate said first information, said second area displays at least one icon that is selectable by the user to designate said second information and said third area displays at least one icon that is selectable by the user to designate said third information;
a memory for storing selected first information to third information;
a registration unit for, when said first accepting unit to said third accepting unit accepts at least two pieces of information of the first information to the third information, registering said at least two pieces of information of the first information to the third information as a setting information group in said memory; and
a reading unit for reading said setting information group from said memory in response to a reading instruction,
wherein, when said setting information group is read by said reading unit, said display control unit causes said first area to display said first information, said second area to display said second information and said third area to display said third information.

2. The image processing apparatus according to claim 1, further comprising an acquisition unit for acquiring the image from the acquisition source corresponding to the first information.

3. The image processing apparatus according to claim 1, further comprising an editing unit for editing the image based on the editing process corresponding to the second information.

4. The image processing apparatus according to claim 1, further comprising an output unit for outputting the image to the output destination corresponding to the third information.

5. The image processing apparatus according to claim 1, wherein, in a case where a plurality of acquisition sources are associated with said first information when said first accepting unit accepts an input of said first information, said display control unit causes said display to display a plurality of selectable acquisition sources in the second and third areas.

6. The image processing apparatus according to claim 1, wherein, in a case where a plurality of output destinations are associated with said third information when said third accepting unit accepts an input of said third information, said display control unit causes said display to display a plurality of selectable output destinations in said first and second areas.

7. The image processing apparatus according to claim 1, wherein
said accepting unit accepts selection of a registration mode when accepting the first information to the third information, and
said registration unit,
when said accepting unit accepts a first registration mode, registers a new setting information group in said memory based on said at least two pieces of information of the first information to the third information, and,
when said accepting unit accepts a second registration mode, updates the setting information group in said memory based on said at least two pieces of information of the first information to the third information.

8. The image processing apparatus according to claim 1, wherein when said first accepting unit to said third accepting unit accepts the inputs of the first information to the third information, respectively, said display control unit causes said display to display a message indicating that the setting information group is being registered.

9. The image processing apparatus according to claim 8, wherein said display control unit causes said display to display the message in an area other than said first area to said third area.

10. The image processing apparatus according to claim 1, wherein
when said accepting unit accepts an instruction for specifying whether to store said at least two pieces of information of said first information to said third information as said setting information group,
said display control unit displays, in the second area, said at least two pieces of information of the first information to the third information accepted in said first accepting unit to said third accepting unit.

11. The image processing apparatus according to claim 10, wherein said display control unit causes said display to display an icon indicating each of said at least two pieces of information on said second area.

12. The image processing apparatus according to claim 11, wherein
said accepting unit accepts a changing instruction for changing a display style of said icon, and
said display control unit causes said display to display said icon in a display style in accordance with said changing instruction.

13. An image processing method in an image processing apparatus, said image processing apparatus including a display, a memory, and a processor, said image processing method comprising the steps of:
a first accepting step of accepting an input of first information indicating an acquisition source of an image by a first accepting unit;
a second accepting step of accepting an input of second information indicating an editing process of said image by a second accepting unit;
as third accepting step of accepting an input of third information indicating an output destination of said image by a third accepting unit;
a display controlling step of causing said display to concurrently display first, second and third mutually exclusive areas corresponding to said first, second and third accepting units respectively, so that said first, second and third mutually exclusive areas are arranged relative to one another in a sequence that corresponds to an input operation by a user sequentially inputting the first information to the third information, wherein said first area displays at least one icon that is selectable by a user to designate said first information, said second area displays at least one icon that is selectable by the user to designate said second information, and said third area displays at least one icon that is selectable by the user to designate said third information;
when accepting at least two pieces of information of the first information to the third information in said first to third accepting steps, registering said at least two pieces of information of the first information to the third information as a setting information group in said memory; and
a reading step of reading said setting information group from said memory in response to a reading instruction, wherein
when said setting information group is read by said reading step, said display controlling step further including the step of causing said first area to display said first information, said second area to display said second information and said third area to display said third information.

14. The image processing method according to claim 13, further comprising the step of acquiring the image from the acquisition source corresponding to the first information.

15. The image processing method according to claim 13, further comprising the step of editing the image based on the editing process corresponding to the second information.

16. The image processing method according to claim 13, further comprising the step of outputting the image to the output destination corresponding to the third information.

17. A non-transitory computer-readable recording medium recording an image processing program for causing an image processing apparatus including a display, a memory, and a processor, to perform:
a first accepting step of accepting an input of first information indicating an acquisition source of an image by said second accepting unit;
a second accepting step of accepting an input of second information indicating an editing process of said image by said second accepting unit;
a third accepting step of accepting an input of third information indicating an output destination of said image by said third accepting unit;
a display controlling step of causing said display to concurrently display first, second and third mutually exclusive areas corresponding to said first, second and third accepting units, respectively, so that said first, second and third mutually exclusive areas are arranged relative to one another in a sequence that corresponds to an input operation by a user sequentially inputting the first information to the third information, wherein said first area displays at least one icon that is selectable by a user to designate said first information, said second area displays at least one icon that is selectable by the user to designate said second information, and said third area displays at least one icon that is selectable by the user to designate said third information;
when accepting at least two pieces of information of the first information to the third information in said first to third accepting steps, registering said at least two pieces of information of the first information to the third information as a setting information group in said memory; and
a reading step of reading said setting information group from said memory in response to a reading instruction; wherein
when said setting information group is read by said reading step, said display controlling step including the step of causing said first area to display said first information, said second area to display said second information and said third area to display said third information.

18. The image processing apparatus of claim 1, wherein said display control unit arranges said first area adjacent one edge of the display, said second area in the center of the display, and said third area adjacent the opposite edge of the display.

19. The image processing apparatus of claim 1, wherein each of the three mutually exclusive areas includes a plurality of icons from which the user can select.

* * * * *